(12) United States Patent
Gregorich et al.

(10) Patent No.: US 11,138,401 B1
(45) Date of Patent: Oct. 5, 2021

(54) STYLUS FEATURE FOR HANDHELD BARCODE SCANNER

(71) Applicant: ZEBRA TECHNOLOGIES CORPORATION, Lincolnshire, IL (US)

(72) Inventors: Dino Ottavio Gregorich, Oceanside, CA (US); Samuel A. I. Lippert, West Saint Paul, MN (US); Garrett R. Woodford, Kansas City, MO (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/023,110

(22) Filed: Sep. 16, 2020

(51) Int. Cl.
*G06K 7/00* (2006.01)
*G06K 7/14* (2006.01)
*G06K 7/10* (2006.01)

(52) U.S. Cl.
CPC ......... *G06K 7/1404* (2013.01); *G06K 7/0017* (2013.01); *G06K 2007/10524* (2013.01)

(58) Field of Classification Search
CPC ....... G06K 7/1404; G06K 2007/10524; G06K 2007/10534; G06K 7/0017; G06K 7/1098
See application file for complete search history.

(56) References Cited

U.S. PATENT DOCUMENTS

| | | | | |
|---|---|---|---|---|
| 4,335,303 A | * | 6/1982 | Call | G06K 1/126 235/454 |
| 4,797,819 A | * | 1/1989 | Dechirot | A47F 5/0807 235/385 |
| 5,404,267 A | * | 4/1995 | Silva | G06F 1/1626 16/430 |
| 10,853,605 B2 | * | 12/2020 | Atkinson | G06K 7/10881 |
| 10,853,608 B2 | * | 12/2020 | Utykanski | G06K 7/10881 |
| 2001/0045466 A1 | * | 11/2001 | Bontly | G06K 7/10881 235/472.01 |
| 2013/0100086 A1 | * | 4/2013 | Kim | G06F 3/03545 345/179 |
| 2015/0356805 A1 | * | 12/2015 | Whiteman | H04N 7/18 382/135 |
| 2016/0034054 A1 | * | 2/2016 | Utykanski | G06F 3/03545 235/462.13 |
| 2016/0034055 A1 | * | 2/2016 | Utykanski | G06K 7/10891 235/462.13 |
| 2016/0036257 A1 | * | 2/2016 | Utykanski | G06K 7/10821 320/103 |
| 2019/0122017 A1 | * | 4/2019 | Atkinson | G06F 3/03545 |
| 2020/0065535 A1 | * | 2/2020 | Utykanski | H02J 7/342 |
| 2020/0065536 A1 | * | 2/2020 | Utykanski | H02J 7/00 |
| 2020/0184165 A1 | * | 6/2020 | Utykanski | G06F 3/04883 |

* cited by examiner

*Primary Examiner* — Daniel I Walsh
(74) *Attorney, Agent, or Firm* — Yuri Astvatsaturov

(57) ABSTRACT

A handheld barcode reader includes a reader enclosure constructed from a dielectric material and a screen engaging member operatively coupled with the reader enclosure. The reader enclosure includes a nose portion and a handle portion coupled with the nose portion and is adapted to accommodate a user's hand. The screen engaging member is constructed from a conductive material and includes an extension member coupled with the nose portion of the reader enclosure and at least one arm member extending from the nose portion of the reader enclosure to the handle portion of the reader enclosure.

8 Claims, 7 Drawing Sheets

STYLUS FEATURE FOR HANDHELD BARCODE SCANNER

BACKGROUND OF THE INVENTION

Handheld barcode readers and/or scanners may be used in warehouse environments, checkout stations, and/or other similar settings. Oftentimes, users may use these handheld scanners in conjunction with portable electronic devices such as, for example, computers, tablets, cellular phones, and the like. The portable electronic devices may have a touch screen interface to assist with its operation. Oftentimes, users may attempt to use the handheld device to interact with the touch screen interface of the portable computing device. In examples where the portable computing device uses a capacitive touch screen interface, such contact by the handheld scanner will not result in triggering an input on the portable electronic device. Accordingly, users may become frustrated with their experience and may continue to use the handheld scanner to press against the screen of the portable electronic device. Such prolonged contact may cause damage to the portable electronic device.

Accordingly, there is a need for improved accessories having improved functionalities.

SUMMARY

According to a first aspect, a handheld barcode reader includes a reader enclosure constructed from a dielectric material and a screen engaging member operatively coupled with the reader enclosure. The reader enclosure includes a nose portion and a handle portion coupled with the nose portion and is adapted to accommodate a user's hand. The screen engaging member is constructed from a conductive material and includes an extension member coupled with the nose portion of the reader enclosure and at least one arm member extending from the nose portion of the reader enclosure to the handle portion of the reader enclosure.

In some of these examples, the screen engaging member establishes a communicative link via the conductive material between a user's hand, when contacting the arm member, and the extension member. In some examples, the screen engaging member includes at least one of a foil, a conductive tape, a conductive paint, or a conductive rubber. In some forms, the screen engaging member may extend at least partially around a bezel of the nose portion of the reader enclosure.

In some approaches, the at least one arm member is positioned on at least one of a side of the handle portion or a rear end of the handle portion. In some examples, a number of arm members may extend along the handle portion of the reader enclosure. In some of these examples, the screen engaging member includes a visual identifier to distinguish the screen engaging member from the reader enclosure. In some examples, the barcode reader may further include an in-hand sensor that switches the handheld barcode reader between an interfacing mode and a barcode reading mode.

In accordance with a second aspect, an accessory for a handheld barcode reader including a nose portion and a handle portion is provided. The accessory includes a frame member adapted to couple with and at least partially extend from the nose portion of the barcode reader and at least one arm member coupled with the frame member. The at least one arm member includes a length that at least partially extends to the handle portion of the barcode reader to be contactable by a user. The accessory is constructed from a conductive material that is adapted to establish a communicative link between a user's hand and the frame member.

In accordance with a third aspect, a handheld barcode reader is provided that includes a reader enclosure constructed from a dielectric material, a power source operatively coupled with the reader enclosure, and a screen engaging member operatively coupled with the reader enclosure and the power source. The reader enclosure includes a nose portion and a handle portion coupled with the nose portion. The handle portion is adapted to accommodate a user's hand. The screen engaging member is constructed from a conductive material and includes an extension member coupled with or integrally formed with the nose portion of the reader enclosure.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
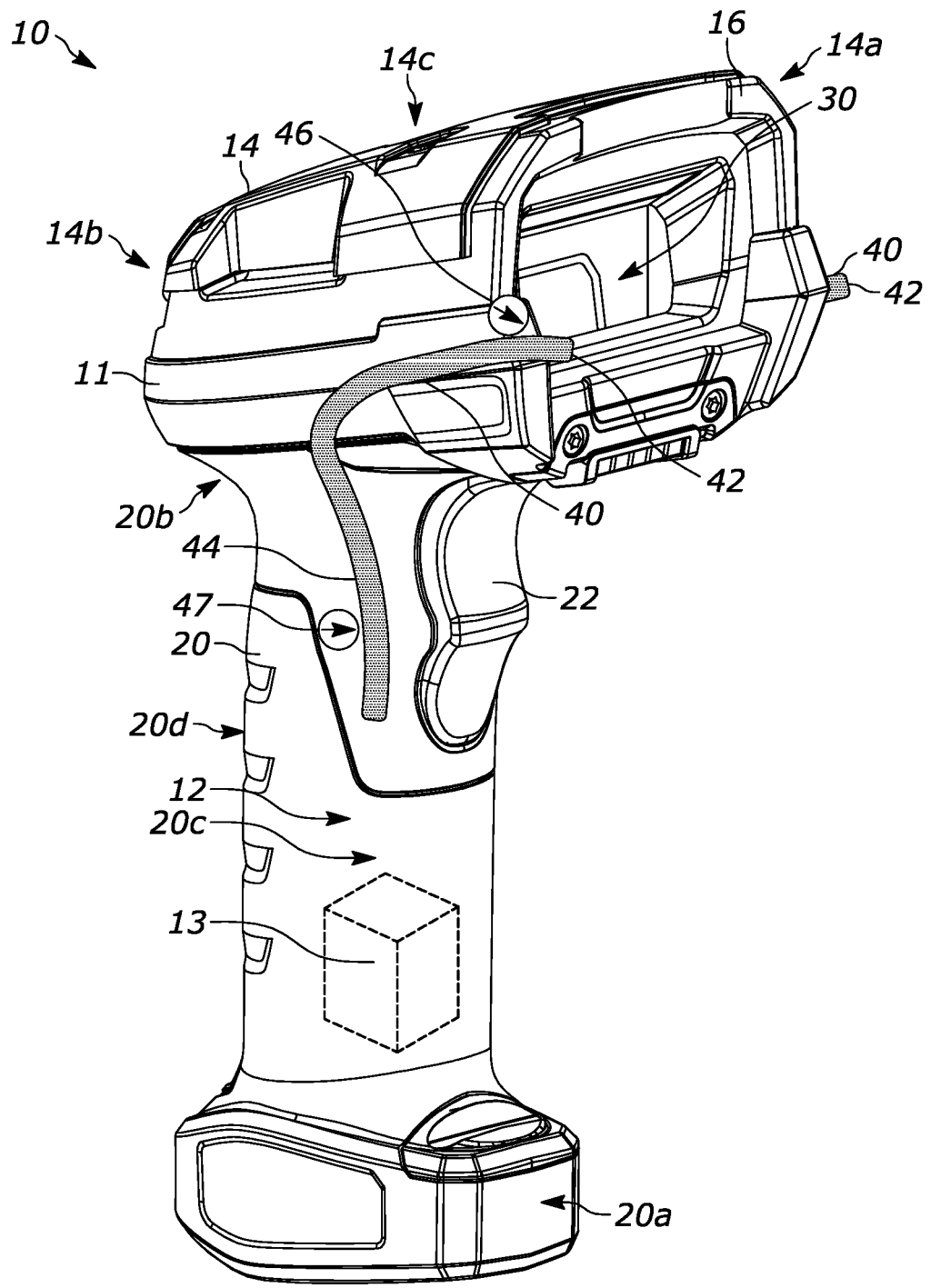
FIG. 1 is a front perspective view of an example handheld barcode reader having a first example screen engaging member in accordance with this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, the present disclosure is directed to a handheld barcode reader having a screen engaging member to engage with a portable electronic device having a capacitive touchscreen. Turning to the Figures, reference numeral 10 generally identifies an example handheld barcode reader capable of performing a number of functions such as, for example, scanning objects appearing in a field of view (FOV). For example, the handheld barcode reader may scan any number of items including barcodes or labels, images, obtain measurements, and any number of additional functions. As used herein the term barcode may refer to one-dimensional or two-dimensional barcodes and/or other symbologies used to encode information associated with items.

As illustrated in the Figures, the handheld barcode reader 10 includes a reader enclosure 11 in the form of a gun-shaped rigid body or housing having an internal cavity 12. The reader enclosure 11 may form a sealed or unsealed internal cavity 12. Further, in some examples, the reader enclosure 11 may be in the form of first and second shell members that are operably coupled with each other via fasteners or other suitable coupling mechanisms. The handheld barcode reader 10 further includes an imaging system 30 including an imaging sensor, a circuit board, and any number of additional components disposed within the internal cavity 12. In some examples, the handheld barcode reader 10 may include a power source 13 disposed within the internal cavity 12. It is appreciated that the handheld barcode reader 10 may include any number of additional features such as, for example, a sound generator, a lens and/or lens arrangement, indicator lights, input/output ports, charging connections, and the like to assist in capturing at least one image of an object appearing in the FOV.

The reader enclosure 11 includes a nose portion 14 and a handle portion 20. Generally, the reader enclosure 11 is constructed from a dielectric material. The nose portion 14 generally accommodates the imaging system 30 and includes a window or lens that allows the imaging sensor to capture the at least one image. The nose portion 14 includes a front end 14a through which the imaging system 30 may capture an image, a rear end 14b, and an elongated length 14c extending between the front and rear ends 14a, 14b thereof. As illustrated in FIG. 1, the nose portion 14 may additionally include a bezel, guard, or bumper 16 at the front end 14a to protect the imaging system 30 (e.g., the lens and/or other components thereof) from damage.

The handle portion 20 is operably coupled with the nose portion 14 and is adapted to accommodate a user's hand and includes a trigger mechanism 22 that activates the imaging system 30 to capture and decode the at least one image appearing in the FOV. The handle portion 20 includes a lower end 20a and an upper end 20b, side portions 20c, and a rear end 20d. The reader enclosure 11 may include any number of mounting mechanisms such as posts, flanges, ledges, channels, and the like, to receive the electrical and/or mechanical components of the handheld barcode reader 10.

Figure 2:
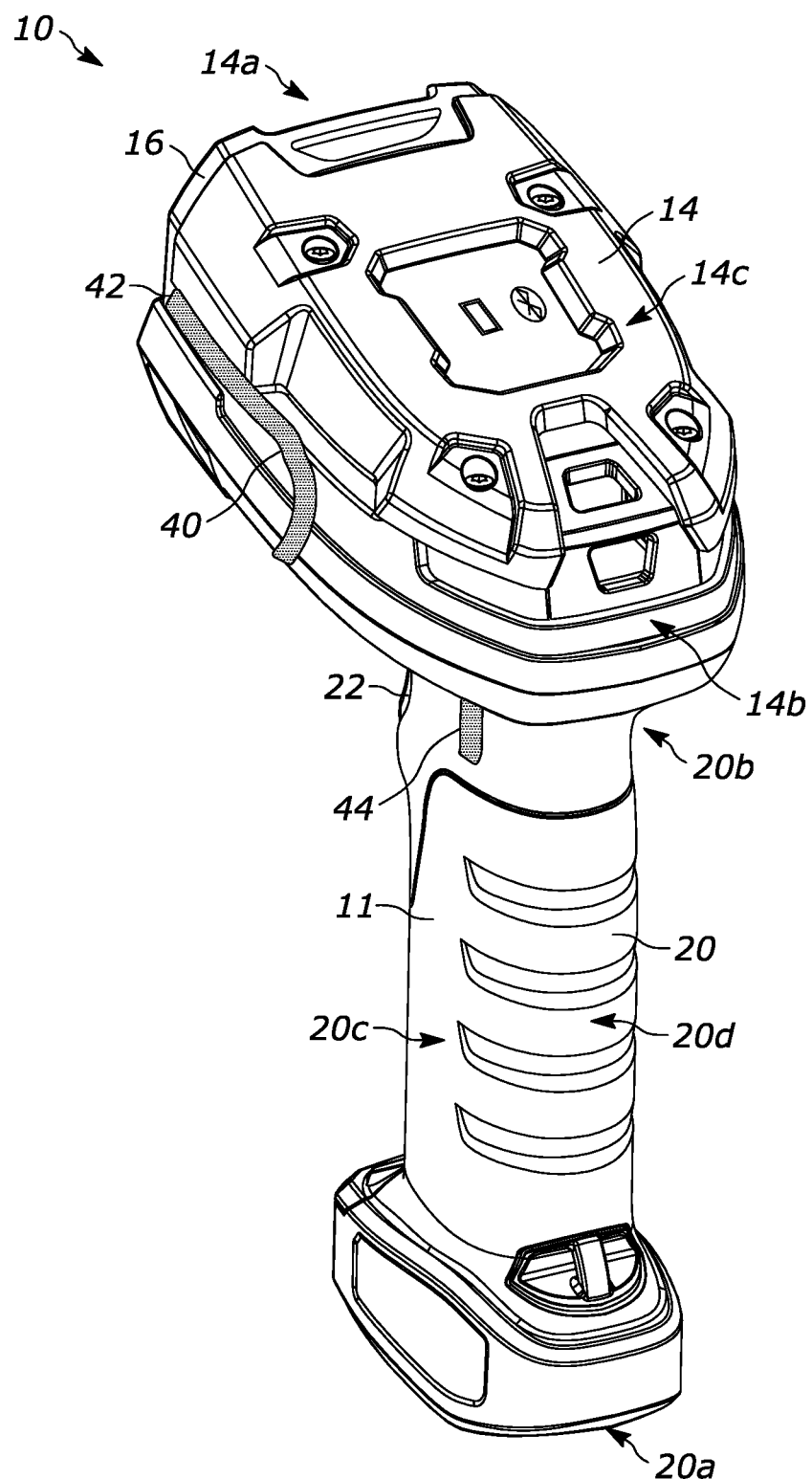
FIG. 2 is rear perspective view of the example handheld barcode reader having the example screen engaging member of FIG. 1 in accordance with this disclosure.
Figure 3:
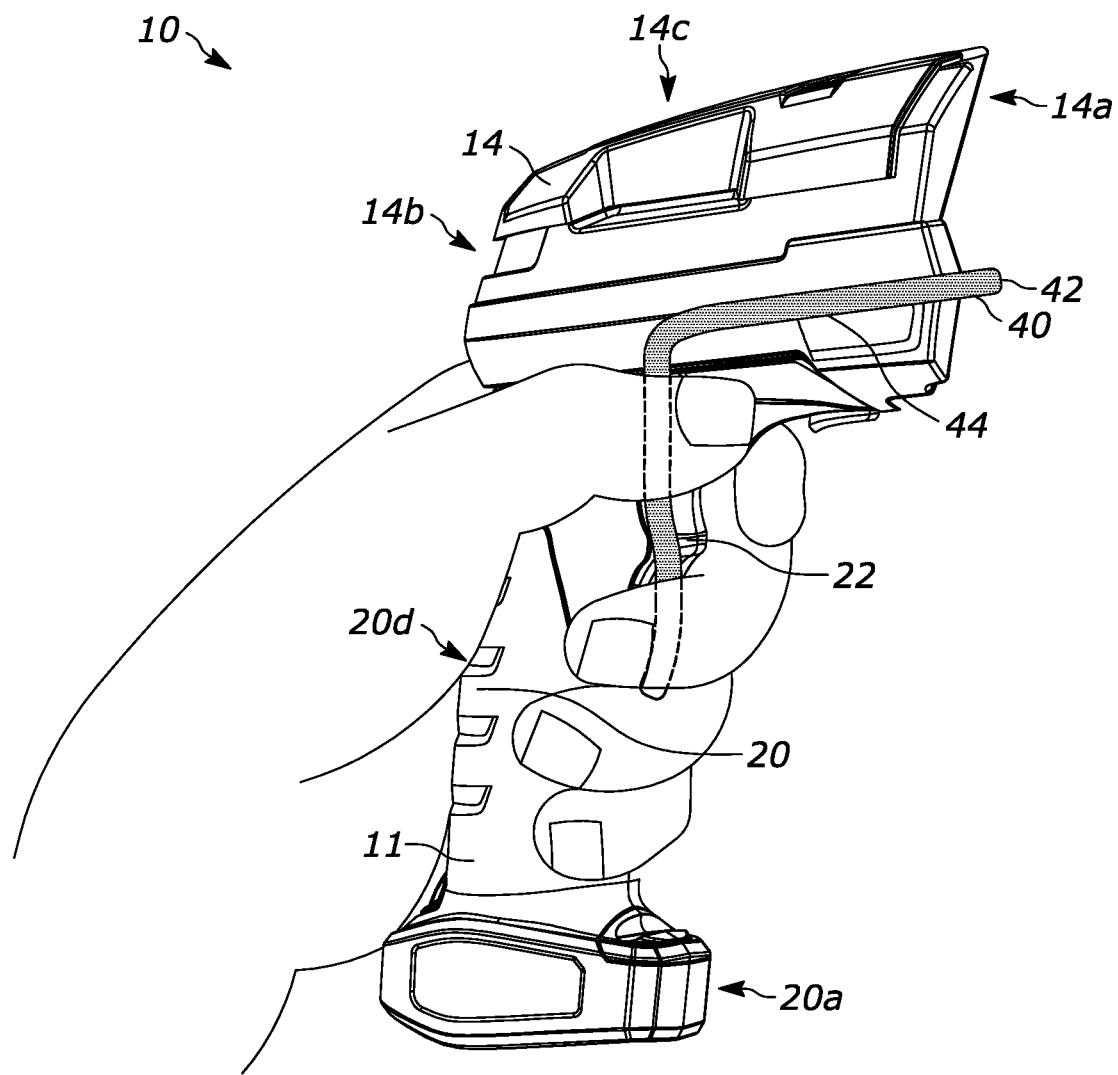
FIG. 3 is a left side elevation view of a user using the example handheld barcode reader having the example screen engaging member of FIGS. 1 and 2 in accordance with this disclosure.
Figure 4:
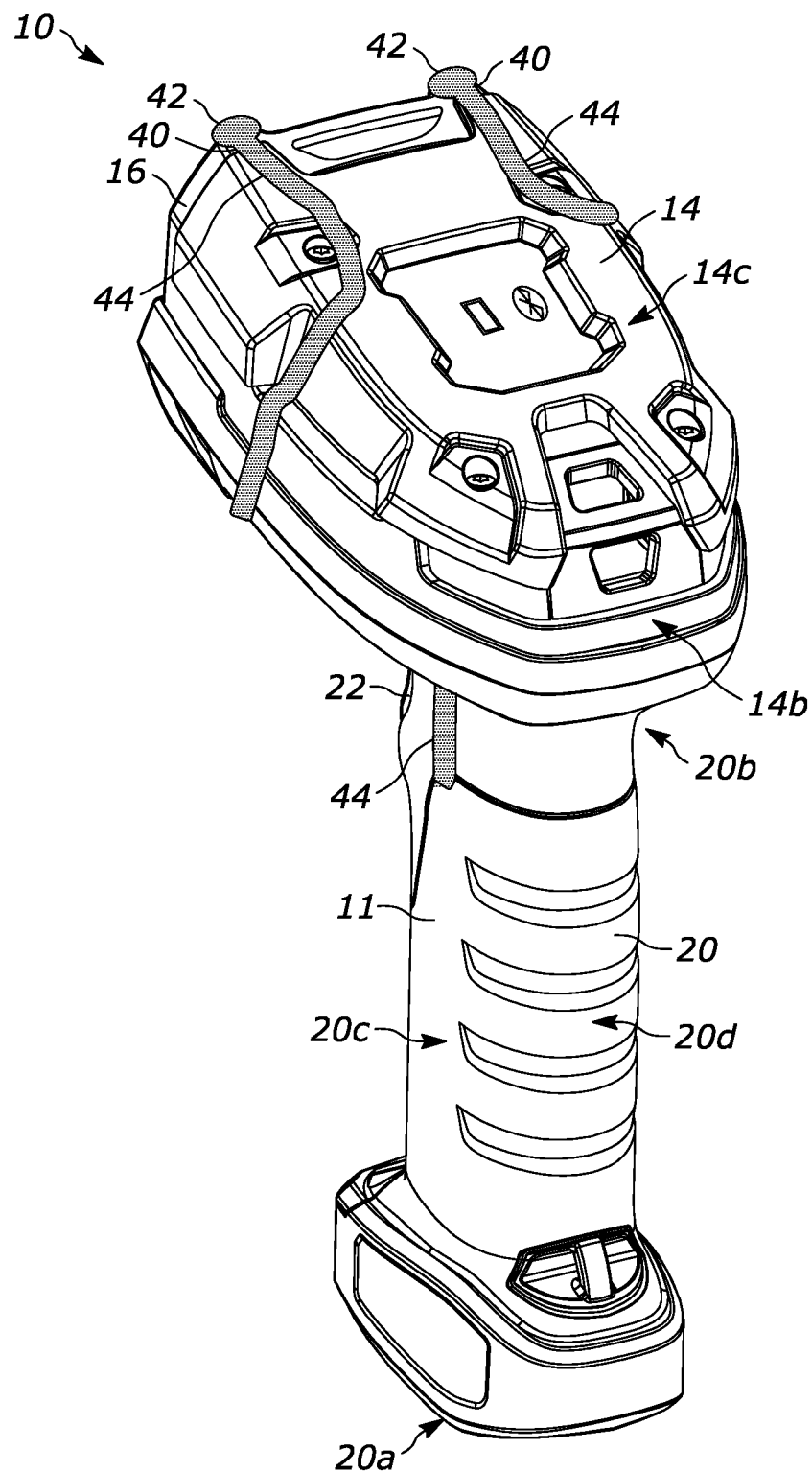
FIG. 4 is a rear perspective view of the example handheld barcode reader of FIGS. 1-3 having a second example screen engaging member in accordance with this disclosure.

The handheld barcode reader 10 further includes a screen engaging member 40. The screen engaging member 40 is operatively coupled with the reader enclosure 11 and includes an extension member 42 and at least one arm member 44 operably coupled with the extension member 42. More specifically, the extension member 42 is operatively coupled with the nose portion 14 of the reader enclosure and extends and/or protrudes beyond the front end 14a thereof. In some examples and as illustrated in FIGS. 1-3, the extension member 42 is in the form of a bump or a nodule, but in other examples, the extension member 42 may for a point, an elongated surface, a flat surface, and/or any other shape. Further, in some examples, the extension member 42 may be in the form of an outer bezel that at least partially surrounds the bumper 16.

The screen engaging member 40 is constructed from a conductive material. More specifically, in some examples, the screen engaging member 40 is constructed from a foil material, a conductive tape, a conductive paint, or a conductive rubber. Other examples are possible. The screen engaging member 40 may be coupled with the reader enclosure 11 via any number of suitable approaches such as, for example, using adhesives, via a friction-fit coupling with the reader enclosure 11 (e.g., via a channel or groove formed therein), or any other approach. In some examples, the screen engaging member 40 may be formed integrally with the reader enclosure 11 via any suitable manufacturing approach such as, for example, coinjection, additive manufacturing, or other similar approaches. Other examples are possible.

Figure 5:
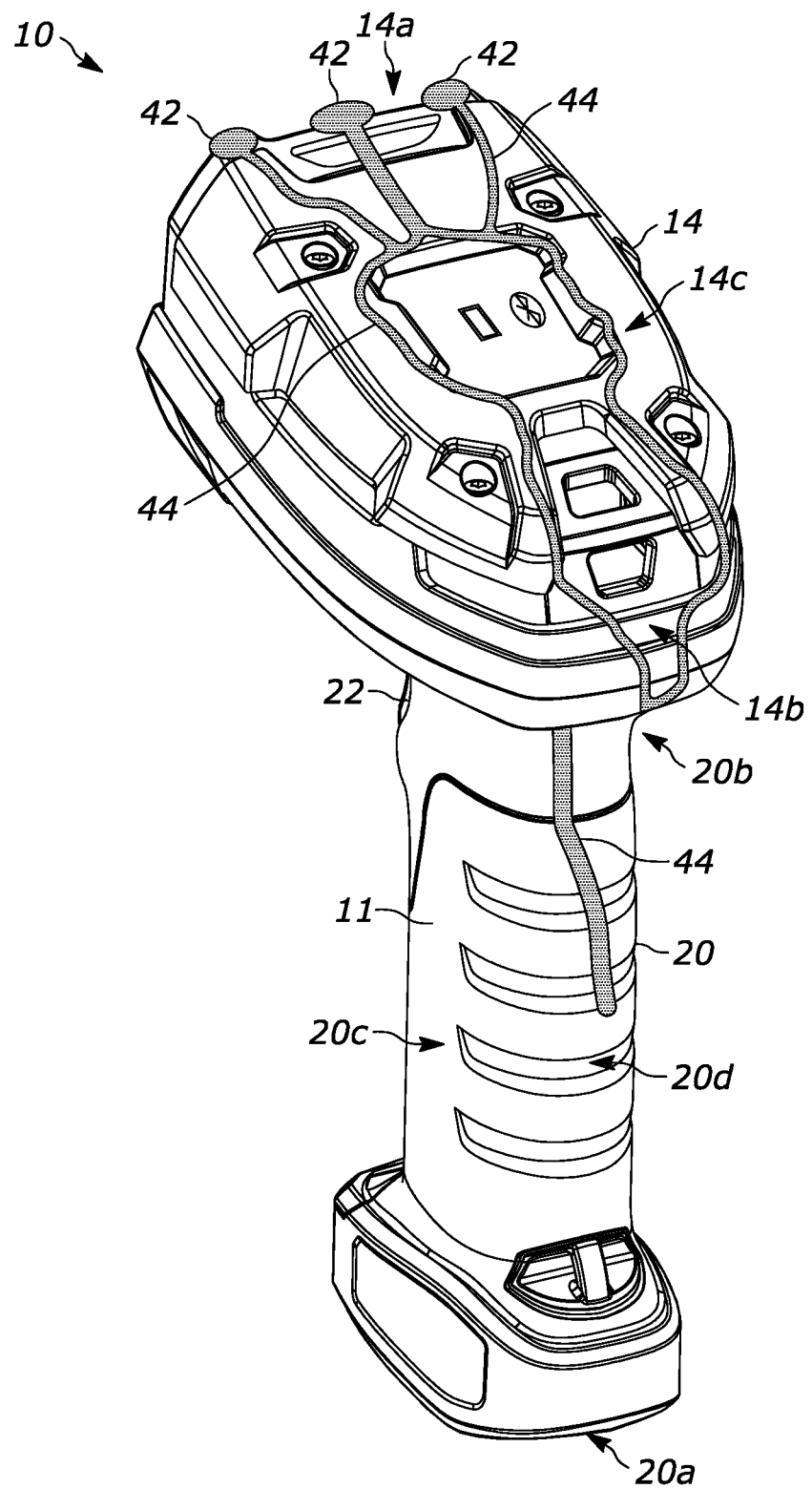
FIG. 5 is a rear perspective view of the example handheld barcode reader of FIGS. 1-3 having a third example screen engaging member in accordance with this disclosure.

The screen engaging member 40 may be coupled with the reader enclosure 11 at any number of desired locations. For example, as illustrated in FIGS. 1 and 2, two screen engaging members 40 are provided on opposite sides of the reader enclosure 11. More specifically, each of the respective arms 44 is positioned along a side portion of the elongated length 14c of the nose portion 14, then extend downwardly onto the side portion 20c of the handle portion 20. In other examples, and as illustrated in FIG. 5, the extension members 42 are positioned along an upper side of the nose portion 14, and the arms 44 similarly extend along the upper side of the nose portion 14 until converging and extending downwardly onto the ear end 20d of the handle portion 20. Other arrangements or combinations of arrangements are possible. It is appreciated that any number of arms 44 (coupled with any number of extension members 42) may converge and/or follow any desired path along the reader enclosure 11 until ultimately extending downwardly towards the lower end 20a of the handle portion 20.

In use, the screen engaging member 40 is adapted to establish a communicative link via the conductive material between a user's hand, when contacting the arm member 44, and the extension member 42. As illustrated in FIG. 3, when a user grasps the handle portion 20, they also contact the arm (or arms) 44. Due to the conductive nature of the arm 44 and the extension member 42, the capacitance of the user's hand is transmitted to the extension member 42, thus allowing the user to contact (or come in close contact with) a capacitive touchscreen of a desired portable electronic device to interact therewith. In some examples and as illustrated in FIG. 1, the screen engaging member 40 may further include a visual identifier 46 (denoted by the arrow in FIG. 1) to distinguish the screen engaging member 40 from the reader enclosure 11. For example, the visual identifier 46 may be in the form of a label or other indicator. In other examples, all or a portion of the screen engaging member 40 may have a different visual appearance (e.g., color) than the reader enclosure 11. Further, in some examples, the arm member or members 44 may include a visual identifier 47 to identify a hand contact region.

The handheld barcode reader 10 may have any number of additional capabilities. For example, the handheld barcode reader 10 may include an in-hand sensor (not illustrated) that senses the presence of the user's hand. Upon sensing the user's hand, the in-hand sensor may allow and/or cause the handheld barcode reader 10 to switch between an interfacing mode whereby the user may engage a touchscreen via the extension member 42 and a barcode reading mode via the trigger mechanism 22. In these examples, depressing the trigger mechanism 22 may cause the handheld barcode reader 10 to switch between these modes. Other examples are possible.

Figure 6:
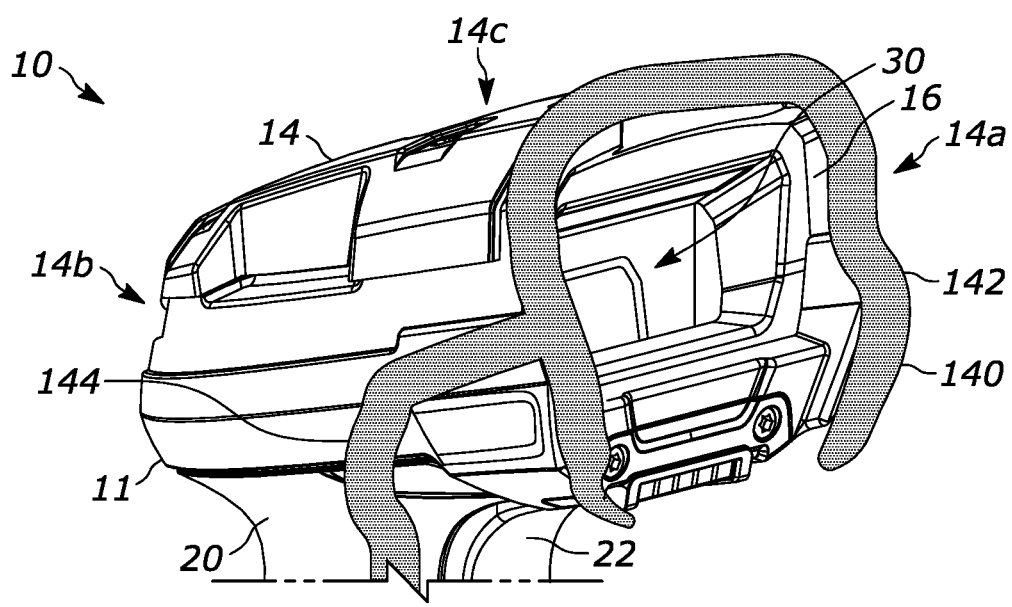
FIG. 6 is a front perspective view of an example accessory for the example handheld barcode reader of FIGS. 1-3 in accordance with this disclosure.

The handheld barcode reader 10 described herein may be constructed using any number of suitable alternative approaches. For example, FIG. 6 illustrates a second example screen engaging member 140 for use with the handheld barcode reader 10. It is appreciated that the screen engaging member 140 illustrated in FIG. 6 may include similar features to the screen engaging member 40 illustrated in FIGS. 1-5, and accordingly, elements illustrated in FIG. 6 are designated by similar reference numbers indicated in the embodiment illustrated in FIGS. 1-5. Accordingly, these features will not be described in substantial detail. Further, it is appreciated that any of the elements described with regards to the screen engaging member 140 may be incorporated into the screen engaging member 40, and vice-versa.

In this example, the screen engaging member 140 is in the form of an accessory that may be retrofitted or otherwise coupled with the handheld barcode reader 10. More specifically, the screen engaging member 140 includes a frame member 142 and at least one arm 144. The frame member 142 may be coupled with the front end 14a of the nose portion 14 via any number of suitable approaches such as, for example, adhesives, fasteners, and/or a friction or snap-fit connection. Other examples are possible. In some examples, the frame member 142 may be coupled with the bumper 16, and in other examples, the frame member 142 may replace the bumper 16. In any event, the frame member 142 at least partially extends from the front end 14a of the nose portion 14. More specifically, the frame member 142 may be in the form of an outer bezel extending outwardly from the front end 14a of the nose portion 14 and/or may include any number of protrusions extending outwardly from the front end 14a of the nose portion 14. As before, the at least one arm 144 extends downwardly onto the handle portion 20 of the reader enclosure 11 to establish a communicative link between the user's hand and the frame member 142.

Figure 7:
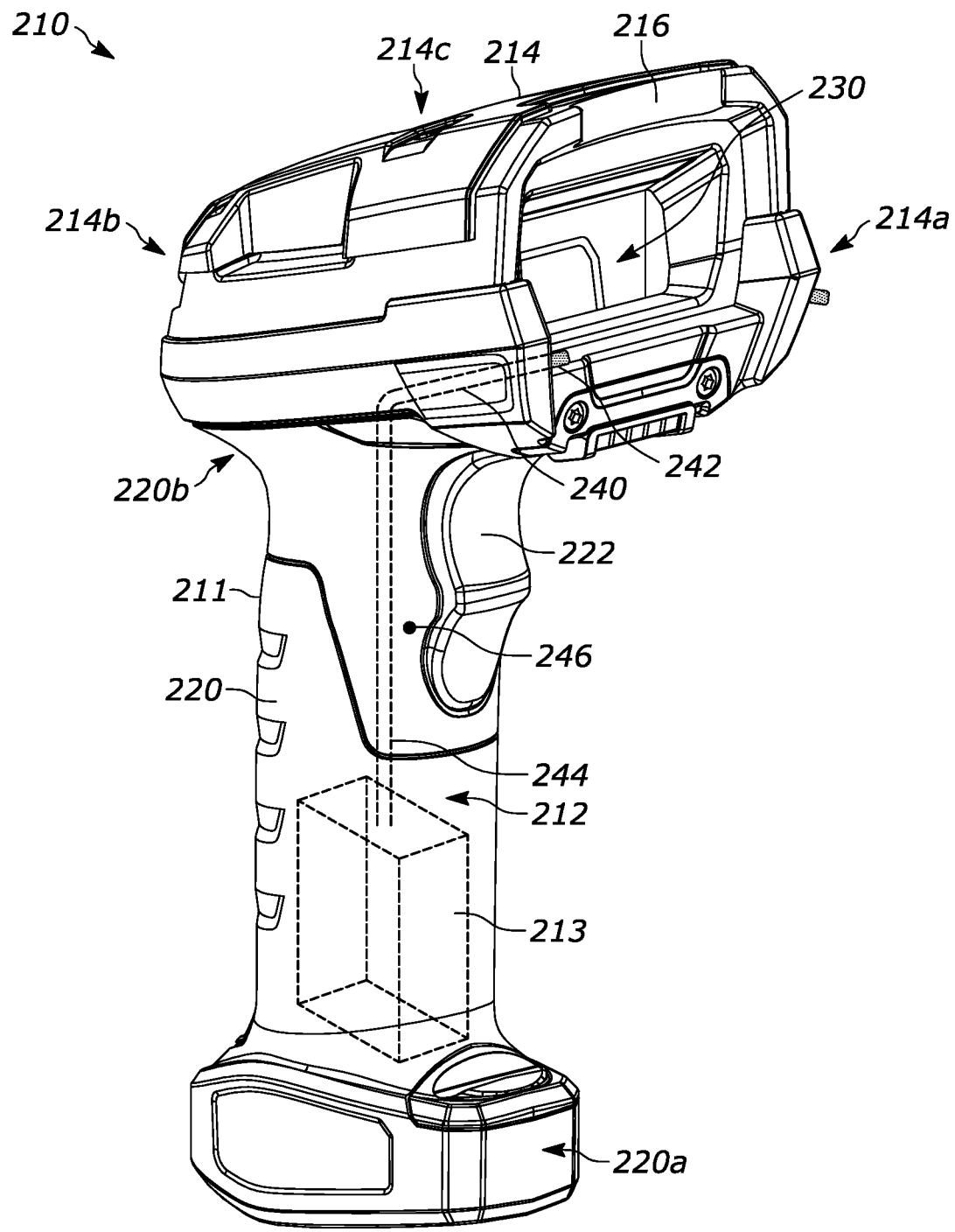
FIG. 7 is a front perspective view of an alternative handheld barcode reader having an alternative example screen engaging member in accordance with this disclosure.

FIG. 7 illustrates a second example handheld barcode reader 210 that includes similar features to the handheld barcode reader 10 illustrated in FIGS. 1-6. Accordingly, elements illustrated in FIG. 7 are designated by similar reference numbers indicated in the embodiments illustrated in FIGS. 1-6 increased by 200. Accordingly, these features will not be described in substantial detail. Further, it is appreciated that any of the elements described with regards to the handheld barcode reader 10 may be incorporated into the handheld barcode reader 210, and vice-versa.

In this example, the screen engaging member 240 is electrically coupled with the power source 213. More specifically, the screen engaging member includes an extension member 242 that is constructed from a conductive material that extends outwardly from the front end 214a of the nose portion 214. The extension member 242 is electrically coupled with the power source 213 via any number of electrical wires, leads, and/or electrical traces 244. In other examples, the extension member 242 may be electrically coupled with a circuit board (not illustrated) disposed within the cavity 212 that is itself electrically coupled with the power source 213. Other examples of suitable arrangements are possible. In any event, the screen engaging member 240 is adapted to establish a communicative link, via the electrical wire 244 between the power source 213 and the extension member 242. In some examples, a toggle member 246 may be used to switch the handheld barcode reader 210 between interfacing and barcode reading modes. Further, in some examples, the extension member 242 may be in the form of a charging lead such that the handheld barcode scanner 210 may be recharged via an electrical connection between a charger and the extension member 242.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A handheld barcode reader comprising:
 a barcode reader enclosure constructed from a dielectric material, the barcode reader enclosure including a nose portion and a handle portion coupled with the nose portion and being adapted to accommodate a user's hand; and
 a screen engaging member operatively coupled with the barcode reader enclosure, the screen engaging member constructed from a conductive material and including an extension member coupled with the nose portion of the barcode reader enclosure and at least one arm member extending from the nose portion of the barcode reader enclosure to the handle portion of the barcode reader enclosure,
 wherein the conductive material continuously extends from the extension member to the arm member, and
 wherein the screen engaging member is adapted to establish an electrically communicative link via the conductive material between a user's hand, when contacting the arm member, and the extension member.

2. The handheld barcode reader of claim 1, wherein the screen engaging member is adapted to establish a communicative link via the conductive material between a user's hand, when contacting the arm member, and the extension member.

3. The handheld barcode reader of claim 1, wherein the screen engaging member comprises at least one of a foil, a conductive tape, a conductive paint, or a conductive rubber.

4. The handheld barcode reader of claim 1, wherein the screen engaging member extends at least partially around a bezel of the nose portion of the barcode reader enclosure.

5. The handheld barcode reader of claim 1, wherein the at least one arm member is positioned on at least one of a side of the handle portion or a rear end of the handle portion.

6. The handheld barcode reader of claim 1, further comprising a plurality of arm members extending along the handle portion of the barcode reader enclosure.

7. The handheld barcode reader of claim 1, wherein the screen engaging member includes a visual identifier to distinguish the screen engaging member from the barcode reader enclosure.

8. The handheld barcode reader of claim 1, further comprising an in-hand sensor adapted to switch the handheld barcode reader between an interfacing mode and a barcode reading mode.

* * * * *